E. ROUNDS.
GEARING.
APPLICATION FILED JUNE 20, 1910.
1,041,877.
Patented Oct. 22, 1912.
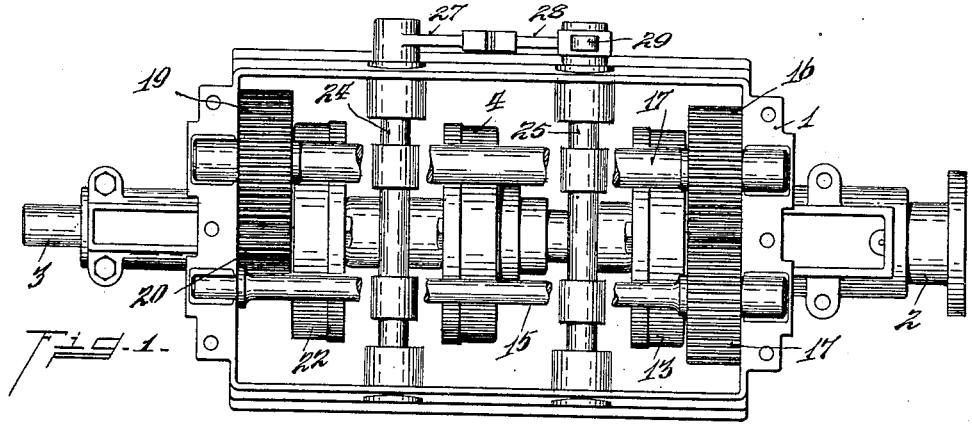
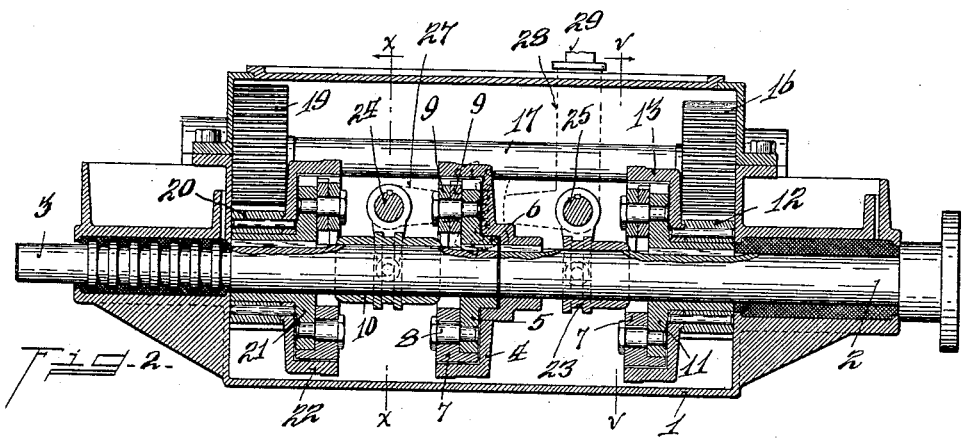
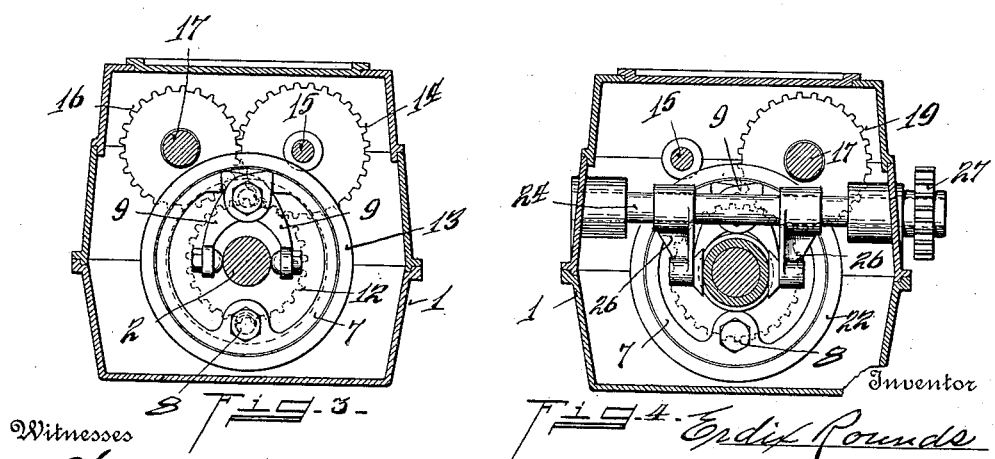
Witnesses
Oliver B. Kaiser
Emma Spewer
Inventor
Erdix Rounds
By Wood & Wood
Attorneys

UNITED STATES PATENT OFFICE.

ERDIX ROUNDS, OF OWENSBORO, KENTUCKY, ASSIGNOR OF ONE-HALF TO GUNTHER-WRIGHT MACHINE COMPANY, OF OWENSBORO, KENTUCKY, A CORPORATION.

GEARING.

1,041,877.          Specification of Letters Patent.        Patented Oct. 22, 1912.

Application filed June 20, 1910. Serial No. 567,877.

*To all whom it may concern:*

Be it known that I, ERDIX ROUNDS, a citizen of the United States, residing at Owensboro, in the county of Daviess and State of Kentucky, have invented certain new and useful Improvements in Gearing, of which the following is a specification.

My invention relates to an improvement in clutch and driving mechanism, primarily employed in connection with marine gas engines.

One of the objects of my invention is to provide clutch mechanism with two relatively alined shafts, a driver and driven, with means carried by and interposed between said shafts, having telescopic engagement, forming an intermediate support against lateral strains at the respective ends of said shafts.

Another object of my invention is to provide clutch mechanism with relatively alined driving and driven shafts, with friction clutch mechanism on the free ends of said shaft, telescopically engaged with each other to form an intermediate support for said shaft and providing means for obtaining a direct drive between said members.

Another object of my invention is to provide clutch mechanism with driving and driven shafts, and a series of friction clutch devices and intermediate train of gearing, said clutch devices controlled by a single lever for imparting forward and reverse rotation to the driven shaft.

Another object of my invention is to provide a pair of clutch devices intermediate of the driving and driven elements and train of gearing for imparting reverse motion to the driven element, whereby when the clutch devices are released, the train of gearing is at rest, relieving the same of all strains.

The features of my invention are more fully set forth in the description of the accompanying drawings, forming a part of this specification, in which:—

Figure 1 is a top plan view of my improved clutch and driving mechanism, with the cover plate and section of the casing removed. Fig. 2 is a central vertical section through the same. Fig. 3 is a section on line *v*, *v*, Fig. 2. Fig. 4 is a section on line *x*, *x*, Fig. 2.

While my invention is primarily adapted for use in connection with marine explosive engines, it is obvious, however, that the same can be applied to various uses, and the general arrangement varied, without departing from the features of my invention.

1 represents a casing, preferably formed of a series of sections clamped together, to provide a liquid tight compartment, and forming convenient means for assembling and to gain access to the various parts.

2 represents the driving shaft, journaled in a bearing formed in one end of the casing, and 3 represents the driven shaft journaled in a bearing formed in the opposite end of the casing.

As illustrated, the driven shaft is provided with a series of annular flanges journaling in grooves formed in the bearing, providing a thrust bearing to relieve the clutch and gearing mechanism of end thrusts incident to marine service.

The shafts 2 and 3 are relatively alined within the casing and provided with intermediate telescoping connections for supporting the free ends of said shafts.

4 represents a cup-shaped disk fixed to the driving shaft 2, having different diameter bores, and 5 represents a disk fixed to the driven shaft 3, provided with a hub portion 6, projected into a bore of the cup-shaped disk 4, thereby forming a telescopic engagement between the two members and an intermediate support.

In this instance, the respective members are so constructed as to form elements of a friction clutch, and when frictionally clamped together, provide substantially a solid shaft for direct drive.

7 represents an expansible and contractible split-ring supported upon the disk 5 by means of a headed pin 8, the whole mounted within the larger diameter bore of the cup-shaped disk 4, and the ring adapted to be expanded and frictionally clamped within said bore of the sleeve 4.

9 represents oppositely disposed levers, pivotally mounted upon the disk 5, each adapted to engage a respective end of the split-ring 8, to expand the same when the levers are actuated.

10 represents a sleeve, slidable upon the driven shaft 3, provided with beveled ends upon which the arms of the levers 9 travel to expand the split ring 7. The means employed for shifting this sleeve will be hereinafter described.

11 represents a disk provided with an elongated sleeve fixed upon the driving shaft 2, and 12 represents a gear loose upon the sleeve of said disk, concentric with the driving shaft 2.

13 represents a cup-shaped disk, fixed to the gear 12 and encompassing the disk 11, said disk 11 is provided with a split ring and oppositely disposed levers to expand the same, substantially as hereinbefore described, for the clutch employed for a direct drive between the two shafts.

14 represents a gear mounted upon the shaft 15, with the ends of said shaft journaled in bearings formed in the ends of the casing. The gear 14 is in mesh with the gear 12 and a gear 16, fixed upon an intermediate shaft 17, journaled in the ends of the casing.

19 represents a gear fixed upon the shaft 17, in mesh with a gear 20, loosely mounted upon the sleeve of the disk 21, said disk 21 is fixed upon the driven shaft 3. A cup-shaped disk 22 is fixed to the gear 20, and the disk 21 is provided with a split-ring and levers, substantially the same in construction and operation as the first described clutch. Thus, when the disks 11 and 13, and disks 21 and 22 are respectively clamped together, and the intermediate direct drive controlling clutch disengaged, a reverse rotation is imparted to the driven shaft from that of the driver, through shaft 2, friction clutch members, gears 12, 14 and 16, intermediate shaft 17, gears 19 and 20, friction clutch members to driven shaft 3.

The clutching devices are actuated by the following instrumentalities:—23 represents a sleeve provided with a beveled end, concentric with and slidably mounted upon the driving shaft 2, adapted to engage the arms 9, mounted upon the disk 11, to expand the ring 7, within the disk 13. 24 and 25 represent rock shafts journaled in the casing 1, and mounted transversely to the driving and driven shafts, each provided with a pair of arms 26, engaging into an annular groove formed upon the sleeves 10 and 23, respectively. 27 represents an arm fixed to the rock shaft 24, its free end provided with a toothed segment in mesh with the teeth of a segment formed on an arm of the bell crank lever 28, fixed to the rock shaft 25, said bell crank lever 28 is provided with a manipulating handle 29. Thus, when the bell crank lever 28 is shifted to any one of three positions—neutral, forward or reverse, the clutch actuating sleeves 10 and 23 are simultaneously actuated in opposite directions. As illustrated in Fig. 2, the various clutches and manipulating lever occupy a neutral position, shifting the lever 28 to the left, which will slide sleeve 23 to the right and sleeve 10 toward the left, actuating the respective levers 9, and expanding the friction rings within the disks 13 and 22, throwing the driving shaft 2 into driving connection with gear 12, and train of gearing and gear 20 into driving connection with the driven shaft 3, thus imparting reverse rotation to the driven shaft. Shifting the lever 28 to the right, will release the clutch member for the reverse drive and engage the sleeve 10 with the arms 9, friction clamping disk 5, with disk 4, coupling the driving and driven shafts, substantially as a solid member for the forward rotation.

The bore in the ring 7, through which the the pin 8 projects, for mounting the same upon its disk, is of larger diameter than the diameter of the pin, (see Figs. 2 and 3), which, when the ring is expanded, permits its entire periphery to be engaged with its cup-shaped disk, and when the ring is contracted, the ring automatically centers itself so as to be entirely free from contact with its engaging cup-shaped disk, caused by the contraction of the ring. This is very important when run at high speed, as no friction is created between the two members in their unclutched condition.

According to the gearing arrangement illustrated, the clutch mechanism reverses at the same speed as the driving or forward motion and with the parts completely inclosed in the casing, can be submerged in oil, affording perfect lubrication.

Having described my invention, I claim:—

1. In a device of the class described, a casing, relatively alined driving and driven shafts journaled therein, friction clutch elements upon the adjacent ends of said shafts telescopically engaged, each of the friction clutch elements being fixed to its respective shaft and providing an intermediate support therefor, means for uniting said elements, a second clutch member fixed on the driving shaft, and a second clutch element fixed on the driven shaft, each provided with a sleeve concentric with the shaft, a gear journaled upon each of said clutch sleeves, a train of gearing connecting said gears, and means for uniting said gears to their respective clutch elements for transmitting motion from the driving shaft through the gearing to the driven shaft.

2. In a device of the class described, a casing, relatively alined driving and driven shafts journaled therein, a friction clutch member fixed to the driving shaft, a friction clutch member fixed to the driven shaft, said members telescopically engaged with each other, providing an intermediate support for the shaft, a train of gearing connecting said shafts, a gear of said train being loose upon the driving shaft, and a second gear of said train being loose upon the driven shaft, clutch mechanism for each of said loose gears for connecting the same to their respective shafts, and means for simultaneously operating the clutch mechanisms, comprising a hand lever and coöperating toothed segments for simultaneously operating all of the friction clutch mechanisms.

3. A device of the class described, comprising a casing, divided into three sections, with bearings formed between the meeting faces of the sections, rendering the shafts accessible upon separation of the sections, relatively alined driving and driven shafts journaled in two of said sections, friction clutch mechanism upon the adjacent ends of said shafts telescopically engaged with each other, providing an intermediate support for said shaft, means for frictionally clamping the same together, a train of gearing adapted to be connected with said shafts, comprising a gear loose on the driving shaft, a second gear loose on the driven shaft, clutch mechanism for clamping said gears to their respective shafts, intermediate gears and shafts therefor, in driving connection with said first-named gears, said intermediate shafts being journaled in bearings formed between two of said casing sections, and a lever for simultaneously operating all of the friction clutch mechanisms, for alternately controlling said first-named clutch mechanism connecting said driving and driven shafts, and said second clutch mechanisms connecting said shafts with the loose gears thereon.

In testimony whereof, I have hereunto set my hand.

ERDIX ROUNDS.

Witnesses:
  E. W. PEGRAM,
  JNO. S. WRIGHT.

---

Copies of this patent may be obtained for five cents each, by addressing the "Commissioner of Patents, Washington, D. C."